United States Patent
Chakra et al.

(10) Patent No.: US 7,912,917 B2
(45) Date of Patent: Mar. 22, 2011

(54) PERSISTING FORMS DATA IN A COMPOSITE WEB APPLICATION ENVIRONMENT

(75) Inventors: Al Chakra, Apex, NC (US); Raghavendra R. Garlapati, Durham, NC (US); James L. Patrick, Jr., Cary, NC (US); Muthukrishnan Vishwanathan, Piscataway, NJ (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/757,466

(22) Filed: Jun. 4, 2007

(65) Prior Publication Data
US 2008/0301220 A1 Dec. 4, 2008

(51) Int. Cl.
*G06F 15/16* (2006.01)
(52) U.S. Cl. ........................................ 709/217; 709/218
(58) Field of Classification Search .................... 709/217
See application file for complete search history.

(56) References Cited

U.S. PATENT DOCUMENTS

| 2006/0075330 A1* | 4/2006 | Guido et al. .................. 715/507 |
| 2007/0156977 A1* | 7/2007 | Ritter et al. .................. 711/156 |
| 2008/0168164 A1* | 7/2008 | Arseneau ...................... 709/223 |

* cited by examiner

Primary Examiner — Kenny S Lin
Assistant Examiner — Shripal K Khajuria
(74) Attorney, Agent, or Firm — Dillon & Yudell LLP

(57) ABSTRACT

Forms data is reusable in a first webpage after a user goes to a second webpage, and then returns to the first webpage. After providing access to a first webpage via a portal User Interface (UI) on a display on a client computer, a data entry input of forms data for the first webpage is received from a user of the client computer. The user is then provided access to a second webpage via the portal UI. In response to providing access to the second webpage, the server stores the forms data. In response to the user inputting a request to return to the first webpage from the second webpage, the server creates a populated first webpage by populating the first webpage with the multiple forms data that is stored in the server, and then returns the populated first webpage to the portal UI.

17 Claims, 2 Drawing Sheets

US 7,912,917 B2

PERSISTING FORMS DATA IN A COMPOSITE WEB APPLICATION ENVIRONMENT

BACKGROUND OF THE INVENTION

The present disclosure relates to the field of computers, and specifically to software. Still more specifically, the present disclosure relates to persisting web forms data in a composite web application environment such as portals.

A web portal is a gateway for several internal applications from the World Wide Web. The web portal presents a user with a primary starting point for accessing websites that have been identified by the portal designer as having some type of relationship to one another, such as having a common topic, common users, etc. Construction of a portal is accomplished through the use of portlets, which are pluggable User Interface (UI) components that are managed and displayed in the portal. That is, portlets are markable code snippets that produce fragments of markup code, which are then aggregated to build the portal. When executed, the portal contains multiple non-overlapping portlet windows that were created by the portlets.

BRIEF SUMMARY OF THE INVENTION

As described herein, a novel method reuses forms data in a first webpage, after a user goes to a second webpage, and then returns to the first webpage. After providing access to a first webpage via a portal User Interface (UI) on a display on a client computer, a data entry input of forms data for the first webpage is received from a user of the client computer. The user is then provided access to a second webpage via the portal UI. As the server provides access to the second webpage, the server also stores the forms data. In response to the user inputting a request to return to the first webpage, the server creates a populated first webpage by populating the first webpage with the forms data that is stored in the server, and then returns the populated first webpage to the portal UI.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
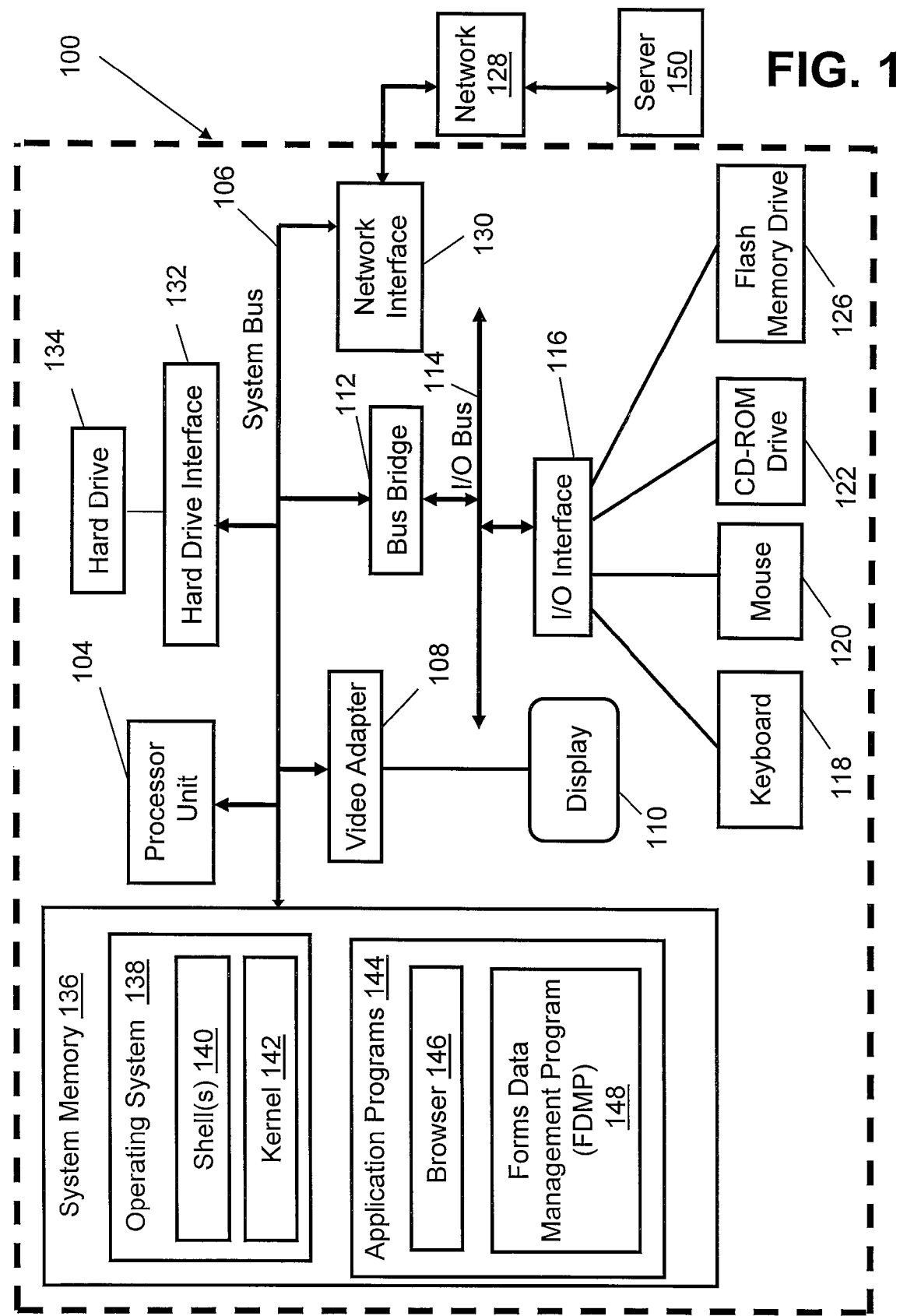
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Before describing details of the present new and useful invention, consider the following.

Portals are the new desktops that organizations are embracing in today's market. Fat client applications are replaced through web browser based applications, where each browser window view represents several such composite applications. One of the challenges in composite web application/portlet development is dealing with data persistence. Unless data persistence is designed into the underlying application, information entered into a portlet on one page is lost when the user navigates to a new page. This is especially problematic in transactional portal applications such as those found in call centers, as well as in travel and financial industries. The present invention, as described below in detail, demonstrates transparently persisting forms data while the user switches between portal pages.

Consider the following example.

Amy is the call center agent at a car rental company. She handles customer calls for all the roadside emergencies. She performs her job by logging customer calls into a company's agent web portal. Amy accesses several internal systems such as host system for car information, web application for car rental and customer data, map quest for maps, and other car tire and maintenance systems all integrated on the web portal.

Aron is a customer having trouble with his car, stuck in the middle of the road. He makes a call for roadside emergency assistance. Amy receives the call and starts collecting the information from Aron.

Amy opens up a screen on the web portal to enter the information given by Aron. She then keeps adding information that she needs to access other applications for car and customer related data. Before she accesses the other applications, she needs to store the data already entered on the initial screen or it will be lost when she switches to other screens. This involves server round trips and frequent storage. Moreover, data entered may be incomplete and might fail to store due to data validations. This problem leads Amy to ask repeated questions of Aron which adds to his frustration and results in overall customer dissatisfaction. This poses a significant problem to all the application centric composite application environments such as portals.

Due to the nature of portals and the way they are developed with single "sign-on" features, in which a user logs in once to the portal and can access all the backend applications from the same browser window session, opening multiple browser window sessions for each of the applications is not helpful.

One can apply this example to the scenarios below:

Call Center Application: Most of the call center applications will have a main screen to create a customer case. Users can enter data and switch to any page without losing data.

Form Centric Applications: Any web application, which needs to switch between different forms before completion without bothering the user to store the data.

Other application environments where this invention can be used are stock brokerage systems, customer support systems, travel agency systems etc.

With reference now to FIG. 1, there is depicted a block diagram of an exemplary client-side computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Forms Data Management Program (FDMP) 148. FDMP 148 contains software that, when executed, performs the functions illustrated below in FIG. 2.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Utilizing Persisted Forms Data

Figure 2:
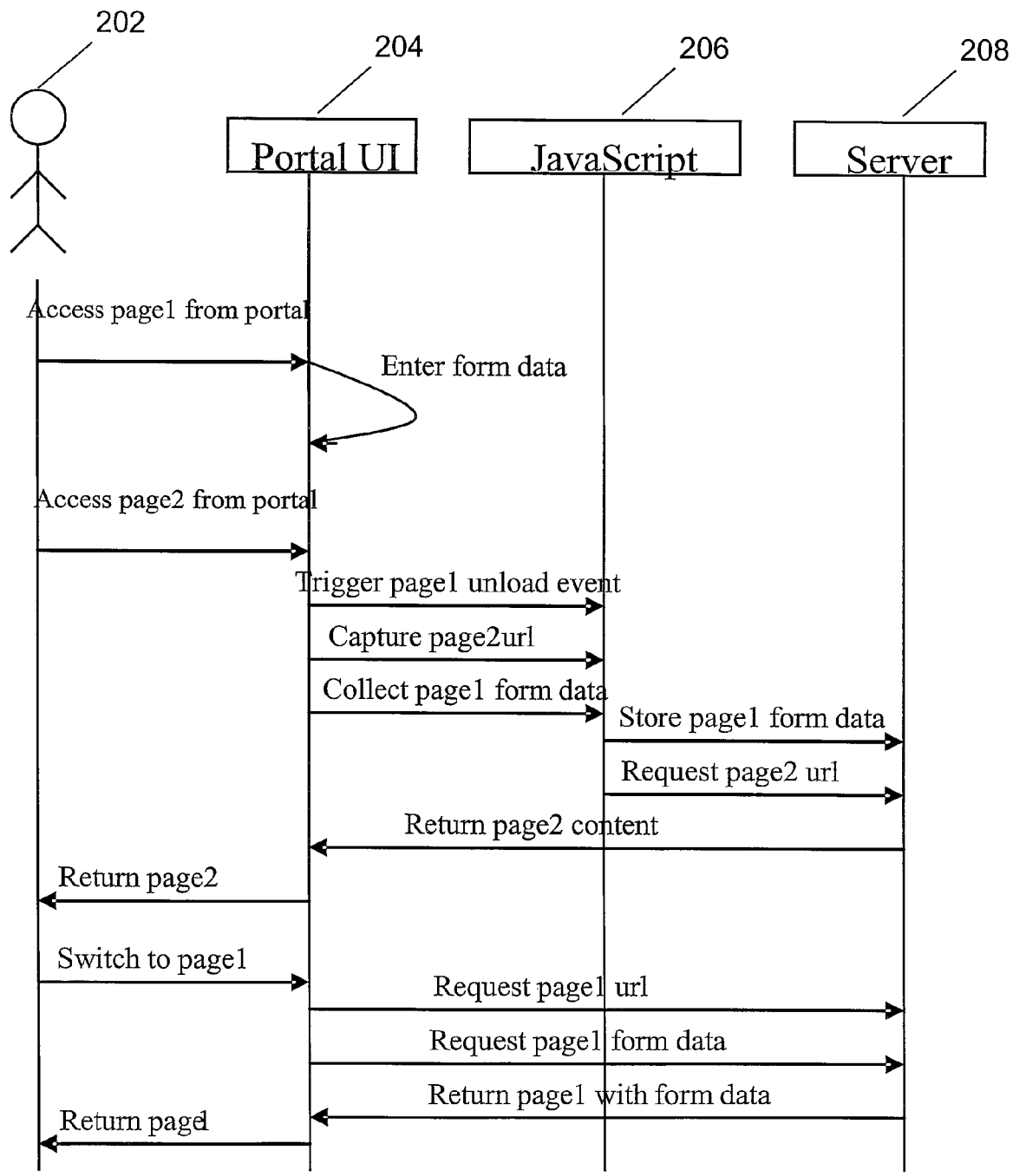
FIG. 2 illustrates a control flow for persisting forms data in a portlet.

With reference now to FIG. 2, a control flow shows the steps taken in an exemplary embodiment to utilize persisted forms data when returning to a first webpage from a second webpage. A user 202 initially accesses a first webpage from a portal User Interface (UI) 204, which is found on a client computer (e.g., computer 100 shown in FIG. 1) via a display (e.g., display 110 shown in FIG. 1). The user enters forms data into a data-entry form in the first webpage, and then accesses a second webpage from the portal UI 204. This causes an unload event, which dumps the entered forms data into a scripted set of code, shown for exemplary purposes as JavaScript 206. Contemporaneously, the Uniform Resource Locator (URL) of the second webpage is stored into the JavaScript 206. The JavaScript 206 then sends this data to a server 208 (e.g., server 150 shown in FIG. 1), along with a request to access the second webpage. The server then returns the second webpage to the client computer's portal UI 204, which is presented to the user 202. The user then inputs a signal to return to the first webpage. This request is sent to the server 208, along with a request for the forms data that was earlier stored in the server 208. The server then returns the first webpage, along with the stored forms data that now re-populates the first webpage, back to the user 202.

Note that in a preferred embodiment, the JavaScript 206 also includes information about the name and namespaces of the first webpage. For example, in the portal environment with multiple portlets on a page, there may be different forms having same object names. However, by associating specific forms data with a namespace (as identified by the JavaScript 206) for a specific webpage, then when the forms data is returned from the server 208, the appropriate forms data is used to populate the (correct) first webpage (as described in the example above).

Below is an exemplary JavaScript code snippet which captures the new page link the user clicked, then sends the form to store at the server side, and then redirects the control to the new page.

```
function formSave(formName, act){
  if(window.document.activeElement != "[object]"
    && window.document.activeElement != null){
  // window.document.activeElement returns the name of the object clicked,
  // we will be using this to capture the link/page user clicked to
  // navigate after submitting the form.
    if (!stopSubmits) {
    stopSubmits = true;
    // We are using stopSubmits as a Boolean variable to stop the form
    // submission if user is intentionally performing other actions in the form.
    var form = document.forms[formName];
    form.all.tags("input").item("hiddenOperation").value = act;
    //hiddenOperation is a hidden field used to differentiate different actions
    // at the server side just in case needed.
    form.elements["url"].value = window.document.activeElement;
    form.submit( );
    window.location.href = form.elements["url"].value;
    // above statement redirects to url clicked after form submit.
    }
  }
}
```

Note that it is very convenient to use different windows to access different applications and multi task among application functions. As web applications have replaced fat client applications, organizations have web enabled most of their systems. There are portal frameworks that have provided a desktop like feel with each portlet window representing a different web application. The present invention fills the gap on true desktop representation of portals for multitasking. Using the present invention when a user switches between web pages to access different portlets, the system will transparently store the data and show it again when he returns.

The present invention is directed to a method for taking all the forms data, storing it, and then loading the entered data back when the user returns to that page, all without any user intervention. Moreover, the present invention is more suitable for composite application environments such as portals which represent different types of back-end integration since, when a user switches pages, he is navigating across different web applications.

Portal frameworks provide certain services and features such as click-to-action, portlet messaging and mashups etc. These features will be very useful when a user has to share data among these applications and to provide integration at the glass. Thus, the present invention is directed to holding data when the user navigates in and out of the application.

One way to store and retrieve data (persist) is to use cookies and JavaScript. This option does not require the browser to do a form submit because the execution processes are on the client side. Any of the above-mentioned form storage techniques can be used to achieve this. In a preferred embodiment, the method used leverages simple JavaScript techniques that force the form submit so that the back-end application can take care of persisting the forms data into a session object. In order to transparently submit the form, the HyperText Markup Language (HTML) BODY tag unloads event is used. This HTML BODY tag defined an HTML document's body, and contains all of the contents of the document, such as text, images, colors, graphics, etc. However, the way portals are developed there is only one HTML BODY tag at the page level; thus, these tags cannot be supplied by each portlet application. Therefore, the unloads event (as shown above in the exemplary HTML pseudocode) is added to the theme's Default.jsp.

In the unload event, the form submit is forced so that the back-end application can read the form elements to persist the forms data.

Note that while the present invention has been described through the use of a first and second webpage, the methodology presented herein is applicable to more numerous webpage usage. For example, forms data may be stored from a first webpage, such that this forms data may be utilized after returning from a third, fourth, or Nth webpage.

Note further that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for reusing stored forms data in a webpage, the method comprising:
   providing access to a first webpage via a portal User Interface (UI) on a display on a client computer, wherein the first webpage includes a data entry form and the portal UI enables access to the first web page and at least a second web page via a single web interface;
   receiving, from a user of the client computer, a data entry input of forms data into the data entry form of the first webpage;
   in response to a request to access to the second web page from the portal UI following entry of the forms data into the data entry form of the first webpage, performing an unload event, which dumps the forms data of the first webpage into a scripted set of code;
   associating a name of the first webpage with the forms data, wherein the forms data is uniquely identified as belonging to the first webpage storing the forms data along with the name of the first web page associated with the forms data in a server;
   providing access to the second webpage via the portal UI;
   presenting the second webpage via the portal UI, wherein the first webpage is replaced in the display of the portal UI by the second webpage;
   in response to receipt of an input representing a request to return to the first webpage within the portal UI:
      forwarding the request to the server along with an associated request for the forms data that was earlier stored in the server;
      initiating the creating in the server of a populated first webpage by the server populating the first webpage with the forms data that was received from the user of the client computer and was stored in the server with the name of the first webpage associated therewith;
      receiving from the server a display of the first webpage, along with the stored forms data, which re-populates the first webpage within the portal UI; and
      returning the populated first webpage to the portal UI at the client computer;
   wherein the forms data is correctly identified and retrieved for populating the first webpage through an association of correct forms data and the name of the first webpage.

2. The method of claim 1, wherein each webpage corresponds to a client application that is replaced with a web browser based application, and wherein a single browser window presents a portal UI that represents several composite applications, including separate applications provided via the first webpage and the second webpage, wherein access to each webpage is provided from the portal UI.

3. The method of claim 2, wherein the storing of the forms data and subsequent returning of the populated first webpage to the portal UI enables utilization of transparently persisting form data of the portal pages within the portal UI when returning to a first webpage from a second webpage and while navigating between different portal pages (webpages) representing different composite web applications.

4. The method of claim 1, wherein:
   associating of the name of the first webpage with the forms data is performed contemporaneously with performing the unload event; and
   the method further comprises storing a Uniform Resource Locator (URL) of the second webpage into the scripted set of code.

5. The method of claim 4, further comprising:
   sending the forms data, including the name of the first web page, and the URL of the second webpage to the server, along with the request to access the second webpage; and
   receiving from the server access to the second webpage within the portal UI on the client computer in response to the server being sent the forms data and the URL of the second webpage.

6. The method of claim 1, further comprising:
   providing within the scripted set of code identifying information about the name and namespaces of the first webpage; and
   enabling retrieval of a correct forms data from the server when returning to the first webpage from the second webpage utilizing the name and namespace of the first webpage stored along with the forms data;
   wherein when two or more webpages have forms data that have a same name, the association of specific form data with a particular webpage, as identified by the scripted set of code, enables appropriate/correct forms data to be utilized to populate each webpage from among the two or more webpages having forms data with the same name.

7. The method of claim 1, wherein the scripted set of code is a JavaScript.

8. A non-transitory computer-readable storage medium encoded with a computer program, the computer program comprising computer executable instructions configured for:
   providing access to a first webpage via a portal User Interface (UI) on a display on a client computer, wherein the first webpage includes a data entry form and the portal UI enables access to the first web page and at least a second web page via a single web interface;

receiving, from a user of the client computer, a data entry input of forms data into the data entry form of the first webpage;

in response to a request to access to the second web page from the portal UI following entry of the forms data into the data entry form of the first webpage, performing an unload event, which dumps the forms data of the first webpage into a scripted set of code;

associating a name of the first webpage with the forms data, wherein the forms data is uniquely identified as belonging to the first webpage-storing the forms data along with the name of the first web page associated with the forms data in a server;

presenting the second webpage via the portal UI, wherein the first webpage is replaced in the display of the portal UI by the second webpage;

providing access to the second webpage via the portal UI;

in response to receipt of an input representing a request to return to the first webpage within the portal UI:

forwarding the request to the server along with an associated request for the forms data that was earlier stored in the server;

creating in the server a populated first webpage by populating the first webpage with the forms data that was received from the user of the client computer and was stored in the server with the name of the first webpage associated therewith;

receiving from the server a display of the first webpage, along with the stored forms data, which re-populates the first webpage within the portal UI; and returning the populated first webpage to the portal UI at the client computer;

wherein the forms data is correctly identified and retrieved for populating the first webpage through an association of correct forms data and the name of the first webpage.

9. The non-transitory computer-readable storage medium of claim 8, wherein:

each webpage corresponds to a client application that is replaced with a web browser based application, and wherein a single browser window presents a portal UI that represents several composite applications, including separate applications provided via the first webpage and the second webpage, wherein access to each webpage is provided from the portal UI; and the storing of the forms data and subsequent returning of the populated first webpage to the portal UI enables utilization of transparently persisting form data of the portal pages within the portal UI when returning to a first webpage from a second webpage and while navigating between different portal pages (webpages) representing different composite web applications.

10. The non-transitory computer-readable storage medium of claim 8, wherein:

the scripted set of code is a JavaScript;

associating of the name of the first webpage with the forms data is performed contemporaneously with performing the unload event; and the computer program further comprises computer executable instructions configured for storing a Uniform Resource Locator (URL) of the second webpage into the JavaScript.

11. The non-transitory computer-readable storage medium of claim 10, wherein the computer program further comprises computer executable instructions configured for:

sending the forms data, including the name of the first web page, and the URL of the second webpage to the server, along with the request to access the second webpage; and receiving from the server access to the second webpage within the portal UI on the client computer in response to the server being sent the forms data and the URL of the second webpage.

12. The non-transitory computer-readable storage medium of claim 8, wherein the computer program further comprises computer executable instructions configured for:

providing within the scripted set of code identifying information about the name and namespaces of the first webpage; and enabling retrieval of a correct forms data from the server when returning to the first webpage from the second webpage utilizing the name and namespace of the first webpage stored along with the forms data;

wherein when two or more webpages have forms data that have a same name, the association of specific form data with a particular webpage, as identified by the scripted set of code, enables appropriate/correct forms data to be utilized to populate each webpage from among the two or more webpages having forms data with the same name.

13. A system comprising:

a processor;

a data bus coupled to the processor;

a memory coupled to the data bus; and a non-transitory computer-usable storage medium embodying computer program code, the computer program code comprising instructions executable by the processor and configured for:

providing access to a first webpage via a portal User Interface (UI) on a display on a client computer, wherein the first webpage includes a data entry form and the portal UI enables access to the first web page and at least a second web page via a single web interface;

receiving, from a user of the client computer, a data entry input of forms data into the data entry form of the first webpage;

in response to a request to access to the second web page from the portal UI following entry of the forms data into the data entry form of the first webpage, performing an unload event, which dumps the forms data of the first webpage into a scripted set of code;

associating a name of the first webpage with the forms data, wherein the forms data is uniquely identified as belonging to the first webpage-storing the forms data along with the name of the first web page associated with the forms data in a server;

presenting the second webpage via the portal UI wherein the first webpage is replaced in the display of the portal UI by the second webpage;

providing access to the second webpage via the portal UI;

in response to receipt of an input representing a request to return to the first webpage within the portal UI:

forwarding the request to the server along with an associated request for the forms data that was earlier stored in the server;

creating in the server a populated first webpage by populating the first webpage with the forms data that was received from the user of the client computer and was stored in the server with the name of the first webpage associated therewith;

receiving from the server a display of the first webpage, along with the stored forms data, which re-populates the first webpage within the portal UI; and returning the populated first webpage to the portal UI at the client computer;

wherein the forms data is correctly identified and retrieved for populating the first webpage through an association of correct forms data and the name of the first webpage.

14. The system of claim 13, wherein:

each webpage corresponds to a client application that is replaced with a web browser based application, and wherein a single browser window presents a portal UI that represents several composite applications, including separate applications provided via the first webpage and the second webpage, wherein access to each webpage is provided from the portal UI; and the storing of the forms data and subsequent returning of the populated first webpage to the portal UI enables utilization of transparently persisting form data of the portal pages within the portal UI when returning to a first webpage from a second webpage and while navigating between different portal pages (webpages) representing different composite web applications.

15. The system of claim 13, wherein:

the scripted set of code is a JavaScript;

associating of the name of the first webpage with the forms data is performed contemporaneously with performing the unload event; and the computer program code further comprises instructions executable by the processor and configured for storing a Uniform Resource Locator (URL) of the second webpage into the JavaScript.

16. The system of claim 15, wherein the computer program code further comprises instructions executable by the processor and configured for:

sending the forms data, including the name of the first web page, and the URL of the second webpage to the server, along with the request to access the second webpage; and receiving from the server access to the second webpage within the portal UI on the client computer in response to the server being sent the forms data and the URL of the second webpage.

17. The system of claim 13, wherein the computer program code further comprises instructions executable by the processor and configured for:

providing within the scripted set of code identifying information about the name and namespaces of the first webpage; and enabling retrieval of a correct forms data from the server when returning to the first webpage from the second webpage utilizing the name and namespace of the first webpage stored along with the forms data;

wherein when two or more webpages have forms data that have a same name, the association of specific form data with a particular webpage, as identified by the scripted set of code, enables appropriate/correct forms data to be utilized to populate each webpage from among the two or more webpages having forms data with the same name.

* * * * *